United States Patent [19]

Krebs

[11] Patent Number: 4,910,414
[45] Date of Patent: Mar. 20, 1990

[54] BOTTOMING CYCLE

[75] Inventor: Mark E. Krebs, Chardon, Ohio

[73] Assignee: Consolidated Natural Gas Service Company, Inc., Pittsburgh, Pa.

[21] Appl. No.: 293,756

[22] Filed: Jan. 3, 1989

[51] Int. Cl.$^4$ .............................................. F25B 27/00
[52] U.S. Cl. ...................................... 290/2; 62/238.4; 290/4 D
[58] Field of Search .................... 290/2, 4 R, 4 D; 62/238.4, 323.1

[56] References Cited

U.S. PATENT DOCUMENTS

| | | | |
|---|---|---|---|
| 3,289,747 | 12/1966 | Harris | 62/238.4 X |
| 4,065,055 | 12/1977 | De Cosimo | 290/2 X |
| 4,342,200 | 8/1982 | Lowl, Jr. | 62/238.4 X |
| 4,715,192 | 12/1987 | Katz | 290/2 X |
| 4,735,061 | 4/1988 | Hsieh | 62/323.1 X |

Primary Examiner—A. D. Pellinen
Assistant Examiner—W. E. Duncanson, Jr.
Attorney, Agent, or Firm—Pearne, Gordon, McCoy & Granger

[57] ABSTRACT

A system for air conditioning and generating electrical power including a fuel-fired internal combustion engine, an electrical motor/generator, and a vapor compressor/expander all interconnected. The vapor compressor/expander driven by the engine operates in one mode with an evaporator and a condenser in a generally conventional refrigeration cycle. In an alternative mode, the vapor compressor/expander is operated in reverse by refrigerant boiled in the evaporator by the rejected heat of the engine and condensed in the condenser and contributes mechanical power to that of the engine to drive the motor/generator. The motor/generator can be supplied external electrical energy to operate as a motor to drive the compressor/expander during periods of non-operation of the engine.

3 Claims, 1 Drawing Sheet

# BOTTOMING CYCLE

BACKGROUND OF THE INVENTION

The invention relates to fuel-fired air conditioning and electrical power generating systems.

PRIOR ART

Known air conditioning systems driven by fuel-fired prime movers such as internal combustion engines can offer significant savings in energy costs when compared to electrically driven units especially when electric time-of-use and on peak demand charges come into effect. Bottoming cycles utilizing the rejected heat of a prime mover have been proposed to improve the efficiency of energy systems but, in general, these proposals have involved considerable extra hardware, complexity and related costs.

SUMMARY OF THE INVENTION

The invention provides a fuel-fired prime mover operated air conditioning and electrical generating system having a bottoming cycle mode that utilizes the air conditioning components to increase operating efficiency while avoiding significant extra hardware and complexity ordinarily attendant with such auxiliary cycles. The invention achieves this result by operating an existing refrigerant vapor compressor in reverse as an expander when not in use for air conditioning. Rejected heat from the prime mover heat engine is conducted to the existing air conditioning evaporator and the residual rejected heat from the bottoming cycle is dissipated through the existing condenser. Mechanical power developed by the compressor/expander is converted to electrical power by a generator driven mainly by the fuel-fired prime mover. An electrical power increase to 10 to 15% can be obtained without additional fuel consumption in the practice of the present invention.

BRIEF DESCRIPTION OF THE DRAWING

The drawing figure is a schematic representation of a fuel-fired air conditioning and electrical power generating system constructed in accordance with the invention.

DESCRIPTION OF THE PREFERRED EMBODIMENT

Figure 1:
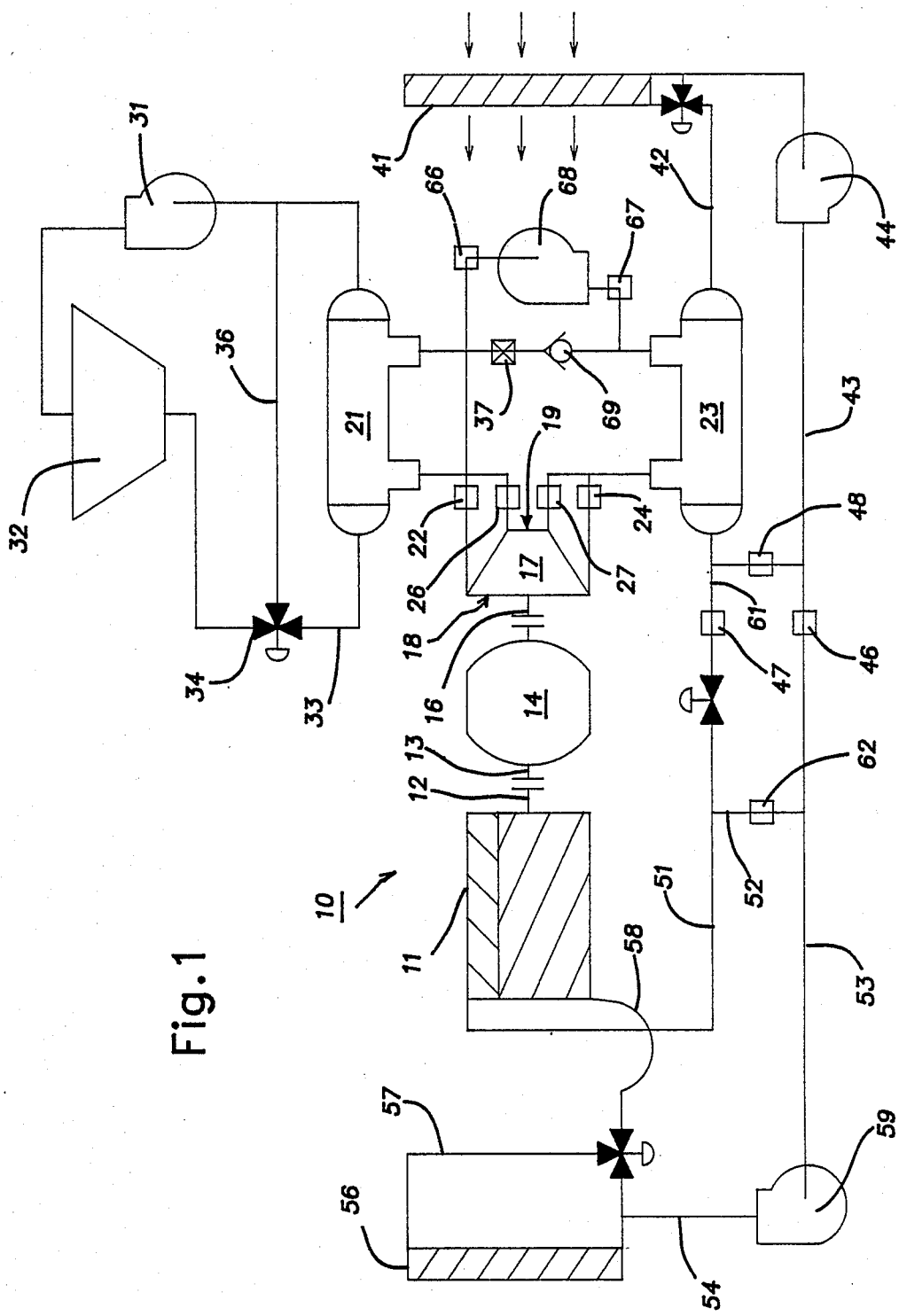

In an air conditioning and electrical power generating system 10, fuel such as natural gas is supplied for combustion to a prime mover 11 such as an internal combustion engine. A power output shaft 12 of the engine 11 is positively coupled to the shaft 13 of a motor/generator unit 14. The motor/generator shaft 13, in turn, is positively coupled to the shaft 16 of a rotary compressor/expander unit 17. The motor/generator shaft 13 also serves to positively couple the engine shaft 12 to the compressor/expander shaft 16. A gear box may be used to obtain optimum shaft speed matching between the engine, motor/generator and compressor/expander.

The compressor/expander unit 17, which advantageously is a rotary vane device known in the art, has a low pressure side 18 and a high pressure side 19. The low pressure side 18 of the compressor/expander unit 17 is selectively connected to an evaporator 23 through a solenoid valve 24 and, in an alternative bottoming cycle mode, is selectively connected to a condenser 21 through a solenoid valve 22. Similarly, the high pressure side 19 of the compressor/expander unit 17 is selectively coupled to the condenser 21 by a solenoid valve 26 and, in the alternative mode, the high pressure side 19 is connected to the evaporator 23 by a solenoid 27.

The evaporator 23 and condenser 21 are generally conventional barrel-type units.

In the air conditioning mode, the compressor/expander unit 17 operates as a refrigerant vapor compressor driven by the engine 11. Vapor compressed and elevated in temperature by the compressor/expander unit 17 passes through the open solenoid valve 26 and is condensed in a generally conventional barrel-type condenser 21. The condenser 21 discharges the heat of condensation to the atmosphere through water circulated by a pump 31 to a cooling tower 3 of generally conventional construction. Water returns from the cooling tower 32 to the condenser 21 through a line 33. A proportional diverting valve 34 allows water to by-pass through a line 36 in a conventional manner.

BY further explanation of the air conditioning mode, condensed liquid refrigerant passes through a thermal expansion valve 37 causing it to evaporate and reduce its temperature while passing into the evaporator 23. Operating in the air conditioning mode, refrigerant in the evaporator 23 chills a fluid circulating through an air cooling coil 41 through connecting lines 42 and 43 under the influence of a circulating pump 44. Solenoid valves 46 and 47 are closed during the air conditioning operational mode while solenoid 48 is open. In a generally conventional manner, air being conditioned at the installation site of the system 10 is forced through the air cooling coil 41 by a fan, not shown, to lower its temperature to that desired. Refrigerant vapor returns to the compressor/expander unit 17 from the evaporator 23 through the open solenoid valve 24 to complete the air conditioning vapor cycle.

In the air conditioning operational mode of the system 10, the engine 11 is cooled by coolant circulating through lines 51–54, a heat balance radiator 56, and lines 57 and 58. A pump 59 maintains circulation of coolant flow through these various lines and radiator 56. When the motor/generator unit 14 is not making electrical energy, as when its excitation field is de-energized, it simply couples the engine 11 to the compressor/expander unit 17 and consumes essentially no engine power.

The engine 11 and motor/generator unit 14 can be used to produce electrical power when the field of the unit 14 is excited. At times when there is no requirement for making refrigeration energy, the compressor/expander unit 17, in accordance with the invention, can be used in a bottoming cycle to produce additional electrical power through the motor/generator unit 14 from heat rejected by the engine 11 and otherwise potentially lost. A fuel savings of 10–15% may be obtained in the production of electrical energy in this manner.

In this bottoming cycle operational mode of the system 10, rejected engine heat, i.e. cooling jacket heat and, if desired exhaust heat, in a known manner, is conducted by coolant in the line 51 and in the line 61 to the evaporator barrel heat exchanger 23. This engine rejected heat contained in the coolant boils refrigerant in the evaporator 23. In this electrical power generating mode, suitable controls open solenoid valves 47 and 46 and close solenoid valves 48 and 62. Additionally, suitable controls open the compressor/expander solenoid valves 27 and 22 and close the other such valves 24 and 26. Still further, the controls open solenoid valves 66, 67 and energize a liquid refrigerant feed pump 68 connected between the condenser 21 and evaporator 23. Relatively high pressure vaporized refrigerant enters the high pressure side 19 of the compressor/expander unit 17 and develops mechanical power as it expands and rotates the rotor. This mechanical power is transmitted directly from the compressor/expander shaft 16 to the motor/generator shaft 13 and is converted to electrical power by the motor/generator 14.

Expanded, low pressure refrigerant vapor exits the low pressure side 18 of the compressor/expander unit 17 through the solenoid valve 22 and enters the condenser 21 where it is condensed to a low pressure liquid. The pump 68 increases the pressure of the liquid refrigerant from the condenser 21 and delivers it to the evaporator 23 where it is again boiled and again goes through the bottoming cycle just described. A check valve 69 prevents back flow through the thermal expansion valve 37.

From the foregoing description, it will be seen that a bottoming cycle for beneficially converting rejected engine heat to usable electrical power is obtained with relatively little extra associated hardware and complexity. The motor/generator unit 14 is preferably of the induction type device which can be operated as a motor. Its disposition between the engine 11 and compressor/expander 17 is advantageous where it is desirable to remove the engine 11 for maintenance or replacement and it is desirable to maintain operation of the compressor/expander unit 17 for purposes of air conditioning. In such a case, the shafts 12 and 13 are decoupled and the motor/generator unit 14 is available as a motor to drive the compressor/expander unit 17.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

I claim:

1. A fuel-fired system for air conditioning and electrical power generation comprising a heat engine, a vapor compressor/expander operatively connected to the heat engine, an electrical generator operatively connected to the engine and the vapor compressor/expander, the compressor/expander having a high pressure side and a low pressure side, a refrigeration circuit connected to the compressor/expander including an evaporator and a condenser, the refrigeration circuit containing a vapor, thermal expansion valve means between the condenser and evaporator, means for transferring heat away from the condenser, means for transferring heat from air being conditioned to the evaporator, means for connecting the low pressure side of the compressor/expander to the evaporator and the high pressure side of the compressor/expander to the condenser in a first mode and alternatively the high pressure side of the compressor/expander to the evaporator and the low pressure side of the compressor/expander to the condenser in a second mode, means for selectively transferring heat rejected by the engine to vapor in the evaporator when the connecting means is in the second mode, a feed pump for increasing the pressure of fluid in the condenser and pumping such fluid from the condenser to the evaporator when the connecting means is in the second mode, the vapor compressor/expander being arranged to assist the engine in driving the generator when the connecting means is in the second mode by converting rejected engine heat to mechanical power transferred to the generator.

2. A system as set forth in claim 1, wherein the generator is coupled between the engine and the compressor/expander, the generator being by a type operable as a motor and capable of driving the compressor/expander for air conditioning service when the engine is inoperative.

3. A method increasing the fuel consumption efficiency of a heat engine connected to a generator and a refrigerant vapor compressor/expander in a refrigeration circuit when production of cooling energy is unnecessary comprising the steps of using the rejected heat of the engine to boil refrigerant, causing the boiling refrigerant to drive the compressor/expander as an expander, and using the mechanical energy developed by the expander to assist the engine in driving the generator to produce electrical power.

* * * * *